US010576546B2

(12) United States Patent
Simonato et al.

(10) Patent No.: US 10,576,546 B2
(45) Date of Patent: Mar. 3, 2020

(54) PROCESS FOR PURIFYING METAL NANOWIRES

(71) Applicant: COMMISSARIAT A L'ENERGIE ATOMIQUE ET AUX ENERGIES ALTERNATIVES, Paris (FR)

(72) Inventors: Jean-Pierre Simonato, Sassenage (FR); Caroline Celle, Firminy (FR); Tristan Lescouet, Grenoble (FR); Céline Mayousse, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 426 days.

(21) Appl. No.: 15/313,038

(22) PCT Filed: May 19, 2015

(86) PCT No.: PCT/IB2015/053672
§ 371 (c)(1),
(2) Date: Nov. 21, 2016

(87) PCT Pub. No.: WO2015/177717
PCT Pub. Date: Nov. 26, 2015

(65) Prior Publication Data
US 2017/0120341 A1 May 4, 2017

(30) Foreign Application Priority Data
May 20, 2014 (FR) ...................................... 14 54515

(51) Int. Cl.
*B22F 9/24* (2006.01)
*B01D 21/00* (2006.01)
*B22F 1/00* (2006.01)
*B82Y 30/00* (2011.01)

(52) U.S. Cl.
CPC ................ *B22F 9/24* (2013.01); *B01D 21/00* (2013.01); *B22F 1/0022* (2013.01); *B22F 1/0025* (2013.01); *B82Y 30/00* (2013.01)

(58) Field of Classification Search
None
See application file for complete search history.

(56) References Cited

U.S. PATENT DOCUMENTS

| 2011/0045272 | A1 | 2/2011 | Allemand | |
|---|---|---|---|---|
| 2011/0070404 | A1 | 3/2011 | Naoi | |
| 2013/0160608 | A1* | 6/2013 | Nusko | B22F 1/0025 75/370 |
| 2016/0325352 | A1* | 11/2016 | Alsayed | C08F 226/10 |
| 2016/0368049 | A1* | 12/2016 | Saito | B22F 1/02 |

FOREIGN PATENT DOCUMENTS

| DE | 10 2010 017706 A1 | 1/2012 |
|---|---|---|
| FR | 2991342 A1 | 12/2013 |

OTHER PUBLICATIONS

Mayousse et al. "Improvements in purification of silver nanowires by decantation and fabrication of flexible transparent electrodes. Application to capacative touch sensors.", Nanotechnology, vol. 24, No. 21, Apr. 25, 2013, pp. 1-6 (Year: 2013).*
Oct. 15, 2015 International Search Report issued in International Patent Application No. PCT/IB2015/053672.
Daniel Langley et al. "Flexible Transparent Conductive Materials Based on Silver Nanowire Networks: A Review". Nanotechnology, vol. 24, 2013, pp. 1-20.
Céline Mayousse et al. "Improvements in Purification of Silver Nanowires by Decantation and Fabrication of Flexible Transparent Electrodes. Application to Capacitive Touch Sensors". Nanotechnology, vol. 24, No. 21, Apr. 25, 2013, pp. 1-6.

* cited by examiner

Primary Examiner — Keith Walker
Assistant Examiner — Adil A. Siddiqui
(74) Attorney, Agent, or Firm — Oliff PLC

(57) ABSTRACT

Isolating metal nanowires from a reaction mixture also containing ancillary inorganic particles distinct from the nanowires, includes: providing a mixture of metal nanowires with large particles having at least two dimensions 250 nm or more, and small particles of which the largest dimension is less than 200 nm, in the form of a dispersion in a solvent medium having a viscosity at 25° C. 10 mPa·s or more; leaving the mixture to settle out under conditions conducive to the formation of a supernatent phase including the small particles and of a precipitate comprising the metal nanowires and the large particles; isolating the precipitate, and dispersing the isolated precipitate in a solvent medium having a viscosity at 25° C. less than 10 mPa·s; leaving the suspension to settle out under conditions conducive to the precipitation of said large particles; and recovering the nanowires in the form of a dispersion in the supernatent phase.

13 Claims, No Drawings

PROCESS FOR PURIFYING METAL NANOWIRES

The present disclosure relates to a novel process for purifying metal nanowires by separation of the various by-products contained in the reaction mixture after synthesis of the nanowires.

BACKGROUND

Metal nanowires are of particularly advantageous application in the manufacture of transparent electrically conductive materials, in particular of transparent electrodes, in particular for optoelectronic devices (photovoltaic devices, OPDs (Organic Photo Detectors), screens, etc.), or transparent heating films.

Recent advances in the nanotechnology field have shown that metal nanowires, for example silver nanowires, constitute a particularly advantageous alternative to films based on transparent conductive oxides (known under the abbreviation "TCO"), for example based on indium tin oxide, conventionally used for producing transparent electrodes.

The transparent conductive system is then obtained by forming, from a suspension of nanowires in a solvent (for example, water, methanol, isopropanol, etc.), a percolating network of metal nanowires on a surface, for example made of glass. Numerous advantages are associated with this manufacturing process: low cost, flexibility of the electrodes obtained, wet-processability at low temperature, etc., as described in the publication Langley et al. [1].

Metal nanowires are generally produced, easily and in large amounts, by chemical synthesis in solution, via the reduction of metal salts, for example of silver nitrate for obtaining silver nanowires, with a polyol, generally ethylene glycol.

Unfortunately, this synthesis is not a selective reaction, and impurities are produced during synthesis, in particular small nanoparticles, aggregates (agglomerated nanoparticles) and large particles, for example of rod type. In point of fact, these coproducts are capable of having a negative impact on the performance levels of the electrodes (drop in transmittance at identical conductivity, substantial roughness, etc.).

Consequently, it is advisable to remove these various by-products of the nanowire synthesis reaction, in order to optimize the performance levels of the electrodes and to facilitate their integration, in particular into structures comprising other layers in direct interaction with the electrodes.

Unfortunately, the nanowire purification technique commonly used, which consists of a succession of centrifugation steps, is lengthy, fastidious and difficult to reproduce.

Alternative methods for purifying nanowires have already been proposed. For example, application US 2011/0045272 describes a process for isolating metal nanowires, by precipitation of nanostructures having an aspect ratio greater than 10, from a ternary mixture formed by combining the reaction mixture comprising the nanowires in suspension in a polyol solvent, with water and a ketone.

Mention may also be made of Mayousse et al. [2] who propose leaving the reaction mixture after silver nanowire synthesis to settle out for several days. This settling out makes it possible to separate the nanoparticles which are in the supernatant phase, from the nanowires present in the precipitate. While this process makes it possible to be rid of the nanoparticles, the aggregates and other particles of large size are, together with the nanowires, in the precipitate, and are not therefore separate from the metal nanowires.

SUMMARY

The present disclosure aims to provide a novel method for separating metal nanowires from the ancillary inorganic particles (nanoparticles, aggregates, large particles, for example of rod type) present in the reaction mixture after synthesis of the nanowires.

More specifically, the present disclosure relates to a process useful for isolating metal nanowires from the reaction mixture for the synthesis thereof, also containing ancillary inorganic particles distinct from the nanowires, comprising at least the steps:

(i) providing a mixture of metal nanowires with large particles having at least two dimensions greater than or equal to 250 nm, and small particles of which the largest dimension is strictly less than 200 nm, in the form of a dispersion in a solvent medium S1 having a viscosity at 25° C. greater than or equal to 10 mPa·s;

(ii) leaving said mixture to settle out under conditions conducive to the formation of a supernatent phase comprising said small particles and of a precipitate comprising the metal nanowires and said large particles;

(iii) isolating the precipitate obtained at the end of the settling out (ii), and dispersing it in a solvent medium S2 having a viscosity at 25° C. strictly less than 10 mPa·s;

(iv) leaving the suspension formed in step (iii) to settle out under conditions conducive to the precipitation of said large particles; and (v) recovering the nanowires in the form of a dispersion in the supernatent phase obtained at the end of the settling out (iv).

DETAILED DESCRIPTION OF EMBODIMENTS

In the remainder of the text, the term "large particles" will be used to denote more simply the particles having at least two dimensions greater than or equal to 250 nm, and the term "small particles" will be used to denote more simply the particles of which the largest dimension is strictly less than 200 nm.

The term "dimensions" of a particle is intended to mean the size of the particle measured according to the various axes (x), (y) and (z) of an orthogonal point of reference. For example, in the case of a particle of rod type, the dimensions of the particle may be its diameter and its length. In the case of a particle of spherical shape, the dimensions measured according to each of the axes (x), (y) and (z) are identical and correspond to the diameter of the particle.

The particle size is measured by transmission electron microscopy (TEM), by scanning electron microscopy (SEM) or by atomic force microscopy (AFM).

The various ancillary inorganic particles, distinct from the nanowires, are described more precisely in the remainder of the text.

Surprisingly, the inventors have discovered that it is possible, by combining two specific settling out steps, to separate the nanowires, both from the small particles and from the large particles, coproduced during the synthesis of the metal nanowires.

The process of the disclosure proves to be particularly advantageous in several respects.

First of all, as illustrated in the example which follows, it makes it possible to obtain a solution of metal nanowires from which the majority, or even all, of the inorganic by-products generated during the synthesis of the metal nanowires have been removed.

Moreover, the process for purifying nanowires according to the disclosure, based on a double settling out, is particularly easy and inexpensive to carry out. It advantageously makes it possible to dispense with the lengthy and expensive conventional technique of purification by means of centrifugations. What is more, the process of the disclosure produces a better purification result, compared with the conventional process of purification by means of centrifugations.

Likewise, the process of the disclosure advantageously makes it possible to dispense with the reaction solvent, used for the synthesis of the nanowires, conventionally ethylene glycol, which is difficult to handle because of its high viscosity and its high boiling point.

Indeed, as detailed in the remainder of the text, at the end of the first settling out according to the process of the disclosure, the supernatent phase, containing essentially the small particles in suspension in the reaction solvent, is removed, whereas the precipitate containing the metal nanowires is recovered.

At the end of the second settling out of the process of the disclosure, the nanowires are thus recovered in a solvent, distinct from the reaction solvent, for example of monoalcohol type, preferably in methanol, ethanol, or a mixture thereof, which is easy to handle, in particular from the point of view of the subsequent use of the nanowires thus purified for preparing electrodes.

Finally, the process of the disclosure makes it possible to recover a satisfactory amount of the nanowires initially present in the starting reaction mixture, in particular more than 50%, advantageously more than 60%, and more particularly more than 75%, of the metal nanowires initially present in the reaction mixture.

disclosure will emerge more clearly on reading the description, the examples and the figures that follow, which are given by way of nonlimiting illustration of the disclosure.

In the remainder of the text, the expressions "between . . . and . . . ", "ranging from . . . to . . . " and "varying from . . . to . . . " are equivalent and are intended to mean that the limits are included, unless otherwise mentioned.

Unless otherwise mentioned, the expression "containing/comprising a" should be understood to be "containing/comprising at least one".

Mixture of the Metal Nanowires and of the Ancillary Inorganic Particles

As mentioned above, a first step of the process of the disclosure comprises providing a mixture of metal nanowires with ancillary inorganic particles, distinct from the nanowires, in a solvent medium having a viscosity at 25° C. greater than or equal to 10 mPa·s.

In particular, such a mixture may be the reaction mixture, obtained at the end of a conventional nanowire synthesis.

The protocols for synthesizing metal nanowires are well known to those skilled in the art. Generally, they use the reduction of metal salts, for example of silver nitrate for the synthesis of silver nanowires, with a polyol, typically ethylene glycol, in the presence of a nucleating agent (generally NaCl) and of polyvinylpyrrolidone (PVP), as described in the publication Langley et al. [1]. The PVP acts as a blocking agent, capable of controlling the rates of growth of the various surfaces of the silver nanocrystals.

The term "solvent medium" is intended to denote a single solvent, or a mixture of at least two solvents.

Preferably, the solvent medium of the initial mixture in which the metal nanowires and ancillary inorganic particles are dispersed, referred to as solvent medium "S1", is formed from a single solvent.

According to one particularly preferred embodiment, the solvent medium S1 is formed from the reaction solvent that was used for the synthesis of the metal nanowires, conventionally ethylene glycol.

According to another implementation variant, the solvent medium S1 may also be formed from the reaction solvent, to which one or more solvents, preferably one (or more) monoalcohol(s) has (have) been added. In particular, the mixture in step (i) may be formed from the reaction mixture, directly obtained at the end of the synthesis of the nanowires, to which an additional volume of solvent has been added, for the purposes of dilution.

According to yet another implementation variant, the solvent medium S1 of the mixture in step (i) may be formed from one or more solvents different than the reaction solvent used for the synthesis of the nanowires. The mixture in step (i) may for example be obtained, prior to carrying out the process of the disclosure, from the synthesis reaction mixture, after separation of the reaction solvent, and addition of one or more solvents of distinct nature.

The solvent medium S1 of the mixture in step (i) is characterized by a viscosity, at 25° C., greater than or equal to 10 mPa·s.

Preferably, the solvent medium S1 has a viscosity at 25° C. between 10 and 50 mPa·s.

The viscosity may be measured by any conventional method known to those skilled in the art, for example using a rotational viscometer, a vibrating body viscometer or a capillary tube viscometer.

According to one particular embodiment, the solvent medium S1 comprises, in particular is formed of, one or more solvents chosen from polyols having from 2 to 6 carbon atoms, preferably diols having from 2 to 4 carbon atoms, in particular chosen from ethylene glycol and propylene glycol.

According to one particularly preferred embodiment, the solvent medium S1 is propylene glycol or ethylene glycol, preferably ethylene glycol.

Preferably, the solvent medium S1 is free of ketone. In particular, it does not comprise acetone.

Metal Nanowires

Metal nanowires are, generally, structures having a diameter of about a few tens of nanometers and a length of several micrometers.

In particular, the metal nanowires have a diameter ranging from 20 to 200 nm, preferably from 20 to 100 nm, and more particularly from 30 to 90 nm.

The length of the nanowires may be more particularly between 0.5 µm and 200 µm, in particular between 1 µm and 50 µm.

The dimensions of the nanowires may also be expressed through the information regarding their aspect ratio (corresponding to the length-to-diameter ratio). Thus, the metal nanowires have more particularly an aspect ratio between 10 and 1000, in particular greater than 20, preferably greater than 100.

The metal nanowires are formed from a metallic material, which may be chosen from elemental metals, for example transition metals, and metal compounds, such as metal oxides. The metallic material may also be a bimetallic material or a metal alloy which comprises at least two types of metals, for example cupronickel (alloy of copper and nickel).

Preferably, the nanowires are formed from one or more metals. By way of example of a metal, mention may in particular be made of silver, gold, copper, nickel, gold-plated silver, platinum and palladium.

According to one particularly preferred embodiment, the metal nanowires according to the disclosure are silver nanowires.

According to one particular embodiment, the mixture of step (i) has a concentration of constituent metallic material of said metal nanowires between 0.1 and 10 g/l, in particular between 1 and 4 g/l.

In the case of silver nanowires, the silver concentration of the mixture in (i) may thus be between 0.1 and 10 g/l, in particular between 1 and 4 g/l.

This concentration may for example be measured by plasma torch spectrometry (ICP-MS or ICP-OES) or atomic absorption.

Of course, those skilled in the art are able to adjust the concentration of metallic material of the starting mixture by adding one or more solvents in an appropriate amount.

Ancillary Inorganic Particles

As mentioned above, the metallic nanowires are obtained, after conventional synthesis, in a mixture with other ancillary inorganic particles.

In particular, the mixture in step (i) comprises, in addition to the metal nanowires, particles, termed "large particles", having at least two dimensions greater than or equal to 250 nm, and particles, termed "small particles" of which the largest dimension is strictly less than 200 nm.

These various particles, coproduced during the synthesis of the nanowires, may be of spherical or anisotropic morphology.

The large particles may more particularly have at least two dimensions between 250 and 5000 nm.

They may be aggregates, formed from particles agglomerated to one another, or individual particles of large dimension, for example strongly anisotropic particles such as rods.

The rods may for example have a diameter greater than or equal to 250 nm and an aspect ratio (length/diameter ratio) typically between 5 and 30.

The largest dimension of the small particles present in the mixture in step (i) may be more particularly between 1 and 100 nm.

The small particles are more particularly particles that are spherical overall, having a diameter between 20 and 80 nm.

According to one particular embodiment, the metal nanowires and the ancillary inorganic particles (small and large particles) are present in the mixture in step (i) in a nanowire/ancillary particle weight ratio between 70/30 and 99/1.

First Settling Out

As specified above, in a second step (ii) of the process of the disclosure, the mixture of step (i) is left to settle out.

This first settling out makes it possible to separate the small particles, as described above, from the nanowires and large particles present in the mixture.

More specifically, this first settling out results in a supernatent comprising said small particles dispersed in the solvent medium S1, while the precipitate (also referred to as "deposit"), resulting from the settling out, comprises the nanowires and large particles.

It is up to those skilled in the art to adjust the operating conditions of the settling out, in particular in terms of duration, to obtain the desired separation, in particular from the viewpoint of the nature of the solvent medium S1 of the initial mixture.

The settling out may be performed at ambient temperature.

Generally, the settling out in step (ii) is performed for a duration ranging from 6 hours to 7 days, in particular from 12 hours to 5 days, and more particularly from 12 hours to 3 days.

In the case where the solvent medium S1 is ethylene glycol, the mixture may be more particularly left to settle out for a duration ranging from 6 hours to 7 days, in particular from 12 hours to 3 days and more particularly from 12 hours to 48 hours.

Of course, the duration of this first settling out may be reduced, to the detriment, however, of the quality of the separation. It is understood that a settling out duration that is too short may result in a loss of a considerable amount of nanowires that would not be settled out.

In a step (iii) of the process according to the disclosure, the precipitate obtained at the end of this first settling out, comprising the majority of the metal nanowires initially present in the mixture (i), is recovered, for example by removing the supernatant phase by means of a suction system such as a pipette.

The supernatant phase removed may be treated separately in order to recover the starting materials, in particular recycling of the metallic material, such as silver.

The product settled out, isolated at the end of the first settling out, is then dispersed in a solvent medium, referred to as solvent medium "S2", having a viscosity at 25° C. strictly less than 10 mPa·s.

The solvent medium S2 is preferably added in a volume such that the suspension thus formed has a concentration of metallic material forming the metal nanowires, for example of silver in the case of silver nanowires, between 0.1 and 10 g/l, in particular between 0.1 and 4 g/l.

Those skilled in the art are of course able to adjust the volume of solvent medium S2 used in order to obtain the desired concentration.

The solvent medium S2 preferably has a viscosity at 25° C. less than or equal to 5 mPa·s, in particular less than or equal to 3 mPa·s, more particularly less than or equal to 2 mPa·s and in particular ranging from 0.1 to 1 mPa·s.

Like the solvent medium S1, the solvent medium S2 may be formed from a single solvent or a mixture of at least two solvents. It is preferably formed from a single solvent.

According to one particular embodiment, the solvent medium S2 comprises, in particular is formed from, one or more solvents chosen from monoalcohols having from 1 to 6 carbon atoms and water.

Preferably, the solvent medium S2 is formed from one or more solvents chosen from methanol, ethanol and propanol.

According to one particularly preferred embodiment, the solvent medium S2 is methanol.

Preferably, the solvent medium S2 is free of ketone. In particular, it does not comprise acetone.

Second Settling Out

According to step (iv) of the process of the disclosure, the suspension, thus formed in step (iii) in the solvent medium S2, is left to settle out.

This second settling out makes it possible to separate the nanowires from the large particles. More specifically, this second settling out results in a supernatant phase which comprises said metal nanowires in the solvent medium S2 and is free of large particles.

The large particles (and also a small part of the nanowires) are recovered in the precipitate.

As for the first settling out, it is up to those skilled in the art to adjust the operating conditions for this second settling out, in particular in terms of duration, in order to obtain the desired separation, in particular from the viewpoint of the nature of the solvent medium S2 of the starting suspension.

The settling out may be performed at ambient temperature.

The duration of this second settling out is, generally, shorter than the duration of the first settling out (step (ii)) of the process of the disclosure.

This second settling out may be performed for a duration ranging from 1 hour to 4 days, in particular from 6 hours to 24 hours and more particularly from 10 to 20 hours.

Of course, the duration of this second settling out may be reduced to the detriment of the quality of the separation, depending on the amount of by-products acceptable in the final solution of nanowires.

At the end of this second settling out step, the supernatent phase comprising the nanowires dispersed in the solvent medium S2 is isolated from the precipitate.

With regard to the precipitate, it may be treated separately to recover the starting materials, in particular recycling of the metallic material, such as silver.

It is understood that a part of the nanowires of the initial mixture may be removed during the various steps of the process of the disclosure, in particular when the main objective is to obtain a final solution of nanowires that is totally free of ancillary inorganic particles.

In particular, the supernatent phase recovered in step (v) comprises more than 50%, in particular more than 60% and more particularly more than 75%, of the nanowires initially present in the mixture of step (i).

According to one particular embodiment, the process of the disclosure may also comprise one or more subsequent steps (vi) of washing the supernatent phase recovered in step (v), in order to remove the organic residues, for example the traces of PVP used during the synthesis of the nanowires.

The washing methods are well known to those skilled in the art, and already implemented after the conventional method of purification by means of centrifugations.

The supernatent phase may for example be washed with acetone and/or with methanol.

According to another particular embodiment, the nanowires may be recovered in dry form, after removal of the solvent medium S2.

For the purpose of using them for the manufacture of a transparent electrical material, they may be redispersed, for example in water or methanol, at the desired concentration (typically, a metallic material concentration between 50 and 1000 mg/l).

The nanowires purified at the end of the process of the disclosure, in suspension in the solvent medium S2, or redispersed in a solvent such as water or methanol, may be used for the manufacture of transparent electrically conductive materials, for example a transparent electrode.

The methods for manufacturing such transparent electrically conductive materials are known to those skilled in the art.

For example, a percolating network of nanowires may be deposited at the surface of a substrate, for example made of glass, using the suspension of nanowires, for example by nebulization, vaporization, spin-coating, coating, serigraphy, etc., preferably by spray-coating.

According to yet another particular embodiment, the nanowires may be subjected to an acid treatment, via (a) the bringing of the metal nanowires (in a dispersion in the supernatent or redispersed in a solvent such as water or methanol) into contact with a solution of an acid, this solution having a pH below 7, preferably below 3, followed by (b) the removal of the acid.

This acid treatment may be performed on the metal nanowires before the manufacture of the transparent electrical material, or once the transparent electrical material has been manufactured. Such a treatment is described in greater detail in document FR 2 991 342.

This acid treatment advantageously makes it possible to improve the electrical and optical performances of the transparent electrically conductive material formed from the metal nanowires.

The invention Embodiments of the disclosure will now be described by means of the following example, given by way of nonlimiting illustration of the disclosure.

EXAMPLE

Synthesis of Silver Nanowires

The silver nanowires are synthesized in ethylene glycol, from silver nitrate ($AgNO_3$), polyvinylpyrrolidone (PVP) and sodium chloride (NaCl), according to the synthesis protocol described in the publication Mayousse et al. [2].

The nanowires, obtained in ethylene glycol, have a diameter between 40 and 80 nm, and a length between 2 and 25 µm (average of 10 µm).

Observation of the solution under an electron microscope shows the presence, in addition to the silver nanowires, of small nanoparticles and large particles (rods, aggregates, large nanoparticles).

1st Settling Out

The reaction mixture, cooled after synthesis of the nanowires, is dispensed into three crystallizers 6.5 cm in diameter. The liquid is present in an amount of 2 cm. The mixture is left to settle out for 2 to 3 days.

After this first settling out, the supernatent is removed with care using a pipette. A grey solid coats the bottom of the crystallizers.

The supernatent containing essentially nanoparticles of size strictly less than 200 nm is put to one side for recovery of the starting materials.

2nd Settling Out

The solid settled out is recovered with methanol (200 ml in total).

Observation of the suspension thus formed under an electron microscope shows the absence of the nanoparticles that were initially present in the starting reaction mixture, and the presence of the nanowires, rods, aggregates and large particles of diameter greater than 250 nm.

The suspension is then dispensed into three crystallizers (6.5 cm in diameter), and settled out.

After 15 hours of settling out, the supernatent containing the nanowires is recovered with care using a pipette, and the pellet settled out is placed to one side for recovery of the starting materials.

The supernatent recovered is subjected to two washes with acetone and with methanol in order to remove the traces of organic residues present in the supernatent.

Observation of the supernatent phase under an electron microscope shows that it now contains only nanowires.

An acid treatment of the nanowires obtained, as described in application FR 2 991 342, may then be carried out.

The nanowires thus purified can then be used for the manufacture of electrodes.

REFERENCES

[1] Langley et al., "Flexible transparent conductive materials based on silver nanowire networks: a review", Nanotechnology 24 (2013) 452001 (20pp);

[2] Mayousse et al., "Improvements in purification of silver nanowires by decantation and fabrication of flexible transparent electrodes. Application to capacitive touch sensors", Nanotechnology 24 (2013) 215501 (6pp).

The invention claimed is:

1. A process useful for isolating metal nanowires from a reaction mixture for the synthesis thereof, the reaction mixture also containing ancillary inorganic particles distinct from the nanowires, the method comprising:
   (i) providing a mixture of metal nanowires with large inorganic particles having at least two dimensions greater than or equal to 250 nm, and small inorganic particles of which the largest dimension is strictly less than 200 nm, in the form of a dispersion in a solvent medium S1 having a viscosity at 25° C. greater than or equal to 10 mPa·s;
   (ii) leaving said mixture to settle out under conditions conducive to the formation of a supernatant phase comprising said small inorganic particles and of a precipitate comprising the metal nanowires and said large inorganic particles;
   (iii) isolating the precipitate obtained at the end of the settling out (ii), and dispersing the isolated precipitate in a solvent medium S2 having a viscosity at 25° C. strictly less than 10 mPa·s;
   (iv) leaving the suspension formed in step (iii) to settle out under conditions conducive to the precipitation of said large inorganic particles; and
   (v) recovering the nanowires in the form of a dispersion in the supernatant phase obtained at the end of the settling out (iv).

2. The process as claimed in claim 1, wherein said metal nanowires are silver nanowires.

3. The process as claimed in claim 1, wherein the mixture of step (i) has a concentration of metallic material forming said nanowires between 0.1 and 10 g/l.

4. The process as claimed in claim 1, wherein said solvent medium S1 has a viscosity at 25° C. between 10 and 50 mPa·s.

5. The process as claimed in claim 1, wherein said solvent medium S1 is formed from one or more solvents selected from the group consisting of polyols having from 2 to 6 carbon atoms.

6. The process as claimed in claim 1, wherein the settling out in step (ii) is performed for a duration ranging from 6 hours to 7 days.

7. The process as claimed in claim 1, wherein the solvent medium S2 has a viscosity at 25° C. less than or equal to 5 mPa·s.

8. The process as claimed in claim 1, wherein said solvent medium S2 is formed from one or more solvents selected from the group consisting of monoalcohols having from 1 to 6 carbon atoms and water.

9. The process as claimed in claim 1, wherein said solvent medium S2 is formed from one or more solvents selected from the group consisting of methanol, ethanol and propanol.

10. The process as claimed in claim 1, wherein the suspension formed in step (iii) has a concentration of metallic material forming said nanowires between 0.1 and 10 g/l.

11. The process as claimed in claim 1, wherein the settling out in step (iv) is performed for a duration ranging from 1 hour to 4 days.

12. The process as claimed in claim 1, comprising one or more subsequent steps (vi) of washing the supernatant phase recovered in step (v) in order to remove the organic residues.

13. The process as claimed in claim 1, wherein said solvent medium S2 of step (iii) is free of acetone and said solvent medium S2 is formed from one or more solvents selected from the group consisting of monoalcohols having from 1 to 6 carbon atoms and water.

* * * * *